United States Patent [19]
Garland

[11] Patent Number: 5,010,726
[45] Date of Patent: Apr. 30, 1991

[54] SYSTEM AND METHOD FOR EFFICIENTLY GENERATING POWER IN A SOLID FUEL GAS TURBINE

[75] Inventor: Richard V. Garland, Chuluota, Fla.

[73] Assignee: Westinghouse Electric Corp., Pittsburgh, Pa.

[21] Appl. No.: 581,243

[22] Filed: Sep. 7, 1990

Related U.S. Application Data

[63] Continuation of Ser. No. 250,277, Sep. 28, 1988, Pat. No.

[51] Int. Cl.⁵ ................................................ F02C 7/10
[52] U.S. Cl. .............................. 60/39.05; 60/39.464; 60/39.511
[58] Field of Search ............. 60/39.02, 39.464, 39.511, 60/728, 39.05, 39.53

[56] References Cited

U.S. PATENT DOCUMENTS

| | | | |
|---|---|---|---|
| 2,958,298 | 11/1960 | Mayers | 60/39.464 |
| 4,426,842 | 1/1984 | Collet | 60/728 |
| 4,462,205 | 7/1984 | Giles et al. | 60/39.464 |
| 4,476,674 | 10/1984 | Berman | 60/39.182 |
| 4,492,085 | 1/1985 | Stahl et al. | |
| 4,537,023 | 8/1985 | Nakamura et al. | 60/39.05 |
| 4,653,268 | 3/1987 | Nakamura et al. | 60/39.05 |
| 4,667,465 | 5/1987 | Munk | 60/39.03 |
| 4,702,074 | 10/1987 | Munk | 60/39.511 |
| 4,714,032 | 12/1987 | Dickinson | 110/347 |

FOREIGN PATENT DOCUMENTS 2277875 6/1976 France.

OTHER PUBLICATIONS

A. J. Scalzo et al., "Westinghouse W-501D 100 MW Single Shaft Heavy Duty Combustion Turbine" (reprinted from *International Power Generation*, Oct. 1980).
P. Berman and J. Hynds, "A High Performance PFB System for Utility Application", American Society of Mechanical Engineering, Paper No. 87GT36, presented Jun. 1987.
R. MacKay et al—"Water Injection Can Add 50% to Gas Turbine Power", *Gas Turbine World*, May–Jun. 1987, pp. 34–41.
W. Fraize & C. Kinney, "Coal-Fired Gas Turbine Power Cycles Using Steam Injection," 13th International Congress on Combustion Engines, (1979).

*Primary Examiner*—Louis J. Casaregola
*Attorney, Agent, or Firm*—K. Bach

[57] ABSTRACT

A system and method for generating power in a solid fuel gas turbine utilizing a pressurized fluidized bed combustor is provided. High efficiency is obtained by evaporation cooling and regenerative heating of the compressor discharge air, thus eliminating the need to recover heat from the turbine exhaust gas by a costly and complex steam bottoming system.

5 Claims, 3 Drawing Sheets

SYSTEM AND METHOD FOR EFFICIENTLY GENERATING POWER IN A SOLID FUEL GAS TURBINE

This application is a continuation of application Ser. No. 07/250,277 filed Sept. 28, 1988 (now abandoned).

FIELD OF THE INVENTION

This invention relates generally to a gas turbine based system for generating rotating shaft power utilizing a solid fuel such as coal and, more particularly, to a system which combines evaporative-regenerative heating of compressor discharge air with combustion of coal, or a carbonaceous char produced from coal, in a pressurized fluidized bed combustor.

The high efficiency, low capital cost and short lead time of gas turbine based systems make them particularly attractive to electric utilities as a means for producing electrical power. However, traditionally, gas turbine operation has been limited to expensive, sometimes scarce, fuels—chiefly distillate oil and natural gas. As a result of the ready availability and low cost of coal, considerable effort has been expended toward developing a gas turbine system for generating electrical power which can utilize coal as its primary fuel. One area in which these efforts have focused concerns systems in which the combustion of coal is carried out in a pressurized fluidized bed combustor, hereinafter PFBC, using the compressor discharge as combustion air. Since to achieve adequate thermodynamic efficiency in such a system it is necessary to recover heat from the exhaust of the gas turbine, it had been thought that a steam bottoming system based on a heat recovery steam generator, hereinafter HRSG, was a necessary component of such a system. However, the cost and complexity of a steam bottoming system has a substantial negative impact on the economic viability of such a coal fired system. This invention discloses a means for the recovery of heat from the exhaust of the gas turbine in such a coal-fired system which, it is anticipated, will achieve the thermodynamic efficiency of a system incorporating steam bottoming but at a substantially lower cost and with significantly reduced complexity.

DESCRIPTION OF THE PRIOR ART

One of the methods considered for utilizing coal in a gas turbine based system involves combustion of coal in a PFBC. Under the simplest version of this approach, ambient air, compressed in the gas turbine compressor in the traditional manner, serves to fluidize the bed and provides combustion air for the PFBC. After combustion in the PFBC, the air, now at a high temperature and vitiated by the products of combustion and entrained particulate matter, is exhausted from the PFBC. The air then flows through a cyclone separator wherein much of the particulate matter is removed followed by expansion through a turbine, wherein useful shaft power is produced. After expansion, the vitiated air exhausted from the turbine is vented to atmosphere.

The efficiency of such systems, however, are restrained by a limitation on the pressure ratio of the turbine. This limitation is necessary to avoid compressor surge as a result of deposition in the turbine of particulate matter (termed fouling), carried over from the PFBC but not removed in the cyclone separator, which increases the back pressure on the compressor driving it into surge. Hence, as disclosed in U.S. Pat. No. 4,476,674 it has been proposed that the turbine be split into high and low pressure components and an indirect heat exchanger added to the PFBC. The air discharging from the compressor is heated in the heat exchanger, thus avoiding direct contact with the coal, so that only clean air flows through the high pressure turbine. Following partial expansion in the high pressure turbine, the air undergoes preheating by entering the PFBC directly, fluidizing the bed and supplying the oxygen necessary for combustion of the coal. After leaving the PFBC the vitiated air is partially cleaned in a cyclone separator and expands through a low pressure turbine, yielding additional useful work, before venting to the atmosphere as before.

The thermodynamic efficiency of such a system is still poor, however, since the gas leaving the low pressure turbine is at a relatively high temperature, so that much of the heat released by the coal is wasted in thermal pollution of the atmosphere. Consequently, as discussed in aforementioned U.S. Pat. No. 4,476,674, to achieve a viable thermodynamic efficiency it had been thought necessary to include a steam system, such as a HRSG, to recover sensible heat from the turbine exhaust gas prior to venting the gas to atmosphere. Steam produced in the HRSG is utilized in a steam turbine to produce additional power. The HRSG steam system will be discussed further below.

A further efficiency detractor associated with PFBC systems results from the need to limit the bed temperature, and hence the temperature of the air entering the turbine, to 1600° F. in order to optimize capture of the sulfur in the coal and avoid carryover of harmful alkali vapors into the turbine. Hence to achieve maximum efficiency, it has been proposed, in "A High Performance PFB System for Utility Application", American Society of Mechanical Engineering Paper No. 87GT36 by P. Berman and J. Hynds presented at the International Gas Turbine show at Anaheim, Calif. in June 1987, to employ a topping combustor to raise the temperature of the air leaving the PFBC heat exchanger to the temperature required for maximum efficiency in the high pressure turbine. Although the topping combustor may be fired on oil or natural gas, to maximize coal utilization the addition of a pyrolysis treatment operation (carbonizer) to the system has been proposed. The carbonizer converts coal to a low BTU gas and a solid, carbonaceous char. The low BTU gas is burned in a topping combustor and the char is burned in the PFBC.

Although the system proposed above offers the possibility of efficient use of coal in a gas turbine based system, the cost and complexity of the system is adversely affected by the need, as mentioned previously, to employ a steam bottoming system to recover sensible heat from the turbine exhaust gas prior to venting it to atmosphere. The steam system components include the HRSG itself, which typically comprises a low pressure evaporator to provide steam for de-aeration, an economizer for feedwater heating, a high pressure evaporator for steam generation, and a superheater. In addition, a deaerator, boiler feed pump, condensate pump, steam turbine, condenser and cooling tower will be required along with a substantial amount of interconnecting piping, foundations, etc. As a result, the total cost of the system will be significantly increased by the presence of the steam bottoming system for exhaust gas heat recovery. In addition, control of the various steam cycle parameters and components will add considerable complexity to the operation of the coal burning system.

It is therefore desirable to provide a scheme for improving the efficiency of a coal fired system by recovering sensible heat from the turbine exhaust gas without resorting to a steam bottoming system. In the past, evaporative cooling followed by regenerative heating of the compressor discharge air has been used as an alternative method of recovering heat from the exhaust gas in conventional gas turbine systems burning liquid or gaseous fuel. Such a scheme for improving the power output and efficiency of a conventional gas turbine system burning liquid or gaseous fuel is described in "Water Injection Can Add 50% to Gas Turbine Power" by R. MacKay, et al, published in May-June 1987 *Gas Turbine World*. pp. 34-41.

Although the evaporative regenerative scheme described above has been proposed as a means for improving the power output and efficiency of a conventional gas turbine system burning liquid or gaseous fuel, it is the belief of the inventor that its potential for use in a solid fuel PFBC gas turbine system has not been discerned and that such use will represent a substantial step in the effort to realize the commercial potential of solid fuel PFBC gas turbine systems for generating electrical power from coal.

SUMMARY OF THE INVENTION

Accordingly, it is the general object of the present invention to provide a means for improving the thermodynamic efficiency of a solid fuel gas turbine system without the cost and complexity of the steam bottoming system taught by the prior art.

More specifically, it is an object of the present invention to provide a method for improving the efficiency of a solid fuel gas turbine system by a regenerative-evaporative scheme.

It is another object of the invention to integrate the regenerative-evaporative scheme into advanced solid fuel systems featuring reheat, topping combustion and carbonization.

Briefly, these and other objects of the present invention are accomplished in a gas turbine system utilizing a compressor, turbine, PFBC, spray evaporator and regenerator. In accordance with the invention the mass flow of the compressor air discharging from the compressor is increased by vaporizing water into the gas in a spray evaporator. Heat recovered from the turbine exhaust gas in the regenerator is utilized to offset the cooling effect of the vaporization by heating the cooled moisture-laden compressed gas prior to its entry into the PFBC, thereby minimizing the additional fuel consumption required to achieve the desired gas temperature entering the turbine. As a result of the increase in mass flow the power produced by the turbine is increased and as a result of adding the additional mass flow to the gas flow after compression the power absorbed by the compressor is not similarly increased, thus freeing all the additional turbine power for use outside the system. Therefore, the increase in fuel consumption is proportionately less than the increase in power production and the thermal efficiency of the system is substantially improved.

DESCRIPTION OF THE PREFERRED EMBODIMENTS

Figure 1:
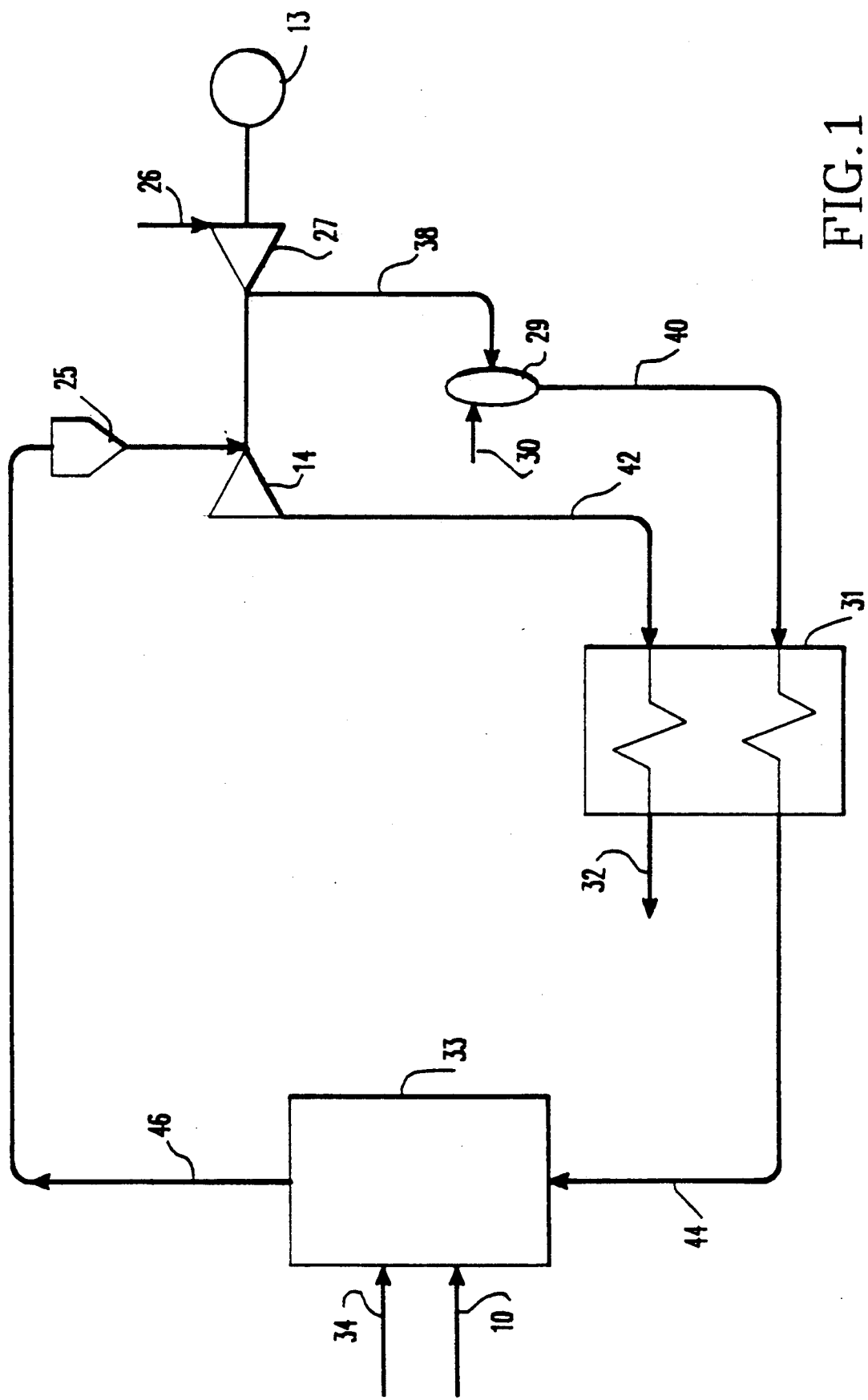
FIG. 1 is a schematic diagram of a basic solid fuel evaporative-regenerative gas turbine system.

Referring to the drawings, wherein like numerals represent like elements, there is illustrated in FIG. 1 a basic solid fuel evaporative-regenerative gas turbine enters a compressor 27 which may be of the axial flow type and is compressed. According to an important aspect of the invention, the compressed gas 38 then flows through a spray evaporator 29 where it undergoes evaporative cooling. The spray evaporator comprises a chamber, water from a high pressure supply 30 is sprayed into the chamber and mixes with the compressed gas flowing through the chamber. As a result of compression the gas is hot, hence the water spray is vaporized in the gas. The water latent heat of vaporization significantly lowers the temperature of the gas while the moisture carried by the gas increases its mass flow.

In accordance with another important aspect of the invention, the cool moisture-laden compressed gas 40 produced by the spray evaporator then flows through a regenerator 31. Expanded vitiated gas 42 produced by a turbine 14 also flows through the regenerator. The regenerator is a chamber in which barriers are disposed which create two groups of passageways. The cool gas from the spray evaporator flows through one group of passageways and the gas from the turbine flows through the second group. The barriers prevent mixing of the two gases as they flow through the regenerator but allow the transfer of heat between the two gases. Since, as a result of the evaporative cooling in the spray evaporator, the temperature of the compressed gas from the spray evaporator is significantly lower than that of the expanded vitiated gas from the turbine, there is considerable heat transfer between the two gases and an attendant significant rise in the temperature of the compressed gas. The heated compressed gas 44 produced by the regenerator then flows to a PFBC 33. The PFBC consumes a solid fuel 10, such as coal, and a sulfur sorbent 34. The PFBC comprises a combustion chamber in which the solid fuel is maintained in a pressurized fluidized bed to promote combustion. The heated compressed gas 44 fluidizes the bed and supplies the oxygen necessary for combustion of the solid fuel in the pressurized fluidized bed (hereinafter PFB); the temperature of the gas is raised by the transfer of heat released by the burning fuel. The amount of solid fuel burned in the PFBC depends on the desired gas temperature.

The hot gas 46 thus produced by the PFBC, now vitiated by the combustion products, flows through a turbine wherein the hot vitiated gas expands, thereby producing power in the rotating shaft of the turbine. Prior to entering the turbine the hot gas from the PFB flows through a cyclone separator 25, wherein much of the particulate matter entrained in the air is removed, thus minimizing erosion and fouling in the turbine. The expanded vitiated gas 42 produced by the turbine 14 flows through the regenerator 31 as explained previously, transferring to the cool compressed gas much of its sensible heat remaining after expansion. The cooled vitiated gas produced by the regenerator is then discharged to atmosphere through vent 32.

Although a portion of the power produced by the turbine is used to drive the compressor 27, a significant excess of rotating shaft power is produced and may be used to generate electrical power by driving the shaft of a dynamoelectric machine 13.

The thermodynamic efficiency of the system thus described can be defined as the ratio of the net power (the portion of the power produced by the turbine available for work outside the cycle, i.e. after the power absorbed by the compressor is accounted for) to the thermal energy available in the fuel consumed (the heat that would be generated by complete combustion of the quantity of fuel consumed). Thus the thermodynamic efficiency is optimized by minimizing the fuel consumed and maximizing the net power produced. An inherent aspect of the gas turbine cycle is that the temperature of the gas after expansion in the turbine, although reduced as a result of the expansion, is still relatively high. Thus, if the gas from the turbine is merely vented to atmosphere, no power will be produced by the portion of the thermal energy released by the fuel in order to raise the temperature of the gas entering the combustor to its temperature after expansion in the turbine, causing a reduction in the efficiency of the system.

In the solid fuel system described, the invention disclosed solves the problem discussed above by utilizing the regenerator 31 to recover much of the thermal energy still available in the expanded gas from the turbine 14. The sensible heat thus recovered is utilized in the system by transferring it to the compressed gas from the compressor prior to its entry into the PFBC thus reducing the fuel consumption required to achieve the desired gas temperature entering the turbine.

Another inherent aspect of the gas turbine cycle is that the power produced by the turbine is proportional to the mass flow of the gas expanded through it. Hence increasing the mass flow increases the power produced. However, since the power absorbed by the compressor in compressing the gas and the fuel consumed in the combustor in heating the gas is also proportional to the mass flows, increases in mass flow do not improve efficiency. The invention disclosed circumvents this limitation and improves the efficiency of the solid fuel system described by more than that achieved by regeneration alone by combining regeneration with increased mass flow from evaporative cooling. Since, according to the invention disclosed, the mass flow of the gas is increased by vaporization of water into the gas after compression, the power absorbed by the compressor is not increased, thus freeing all of the power produced for use outside of the system. Further, while merely vaporizing water in this manner would increase the power produced in the turbine, the cooling effect of the vaporization would increase the fuel consumption required in the combustor to achieve the desired temperature of the gas entering the turbine. However, since the amount of heat transferred in the regenerator is proportional to the temperature difference between the compressed and expanded gases, the cooling of the compressed gas as a result of vaporization increases this heat transfer, thus offsetting the required increase in fuel consumption. Consequently, the invention disclosed substantially improves efficiency of the solid fuel system described by increasing the net power produced in the turbine with only a proportionately smaller increase in solid fuel burned in the PFBC. This improvement in efficiency can be obtained at lower cost and with less complexity than by the use of the steam bottoming system as indicated by the prior art.

Figure 2:
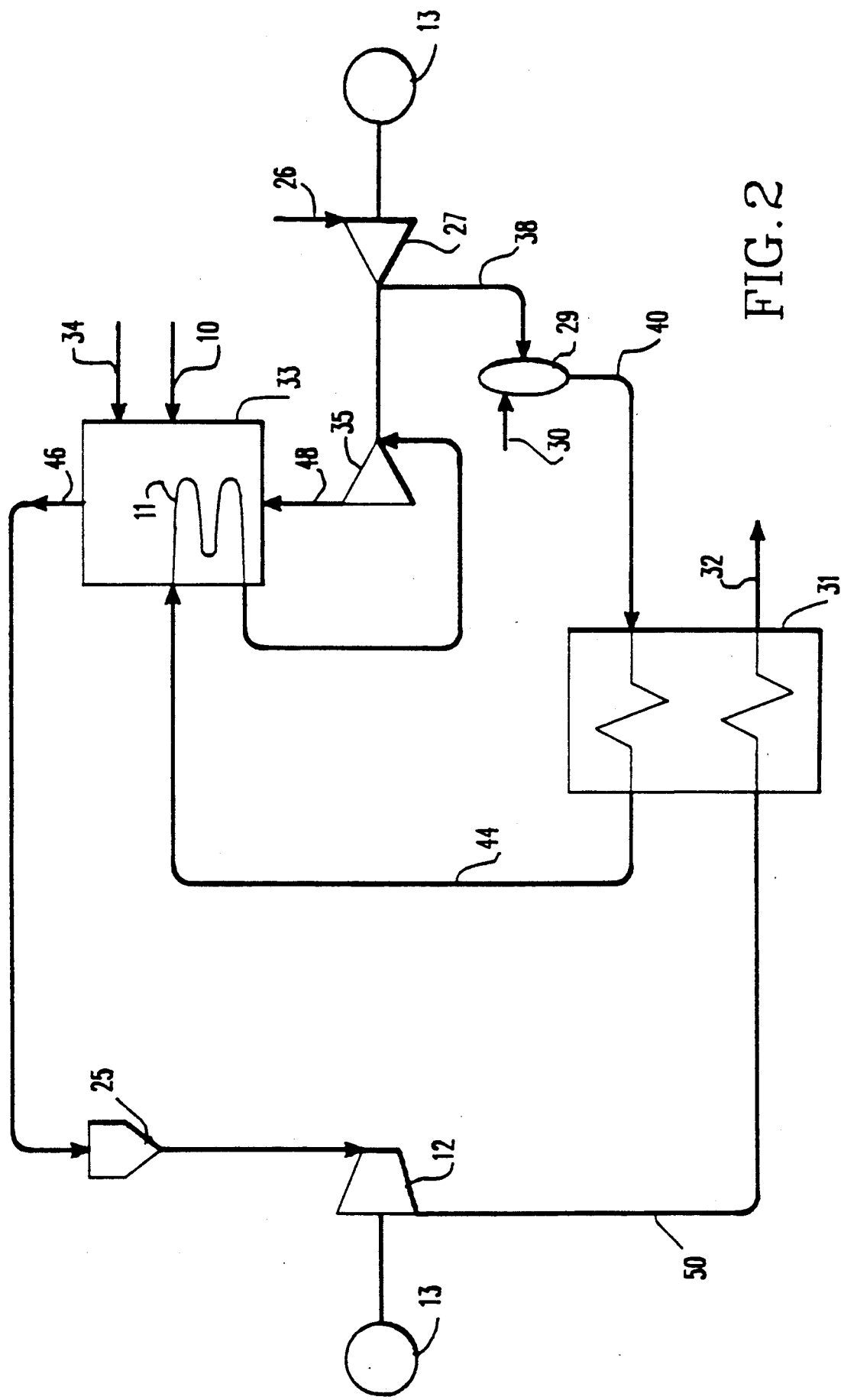
FIG. 2 is a schematic diagram of a solid fuel evaporative-regenerative gas turbine system with reheat.

The benefits of the evaporative-regenerative scheme in a solid fuel system according to the invention disclosed is not limited to the basic solid fuel system illustrated in FIG. 1 and discussed above. Accordingly FIG. 2 illustrates a solid fuel evaporative-regenerative gas turbine system with reheat. In this system the turbine has been split into high and low pressure sections 35 and 12 respectively (alternatively, separate high and low pressure turbines may be used), and the heated compressed gas 44 produced by the regenerator 31 flows through an indirect heat exchanger 11 disposed in the combustion chamber of the PFBC 33 prior to entering the high pressure section of the turbine 35. In the indirect heat exchanger the temperature of the gas is raised by transferring heat released by the burning solid fuel as in the basic system, except that there is no direct contact between the gas and solid fuel. Hence compressor surge due to fouling of the high pressure section of the turbine is avoided as previously discussed. The hot compressed gas from the indirect heat exchanger undergoes partial expansion in the high pressure section of the turbine 35. The partially expanded gas 48 produced by the high pressure section of the turbine then enters the pressurized fluidized bed portion of the PFBC 33, this time mixing with and fluidizing the solid fuel, supplying the oxygen for combustion of the fuel and absorbing heat as in the basic system previously discussed. This heating of the gas between the high and low pressure sections of the turbine is referred to as reheating. The gas 46 produced by the PFBC, now vitiated by the products of combustion, completes its expansion process in the low pressure section of the turbine 12. The expanded vitiated gas 50 produced by the low pressure section of the turbine then flows through the regenerator 31 and the cooled vitiated gas is vented to atmosphere as before. In this system power is produced by both the high and low pressure sections of the turbine. Since this system allows the use of a higher compression ratio in the compressor 27 because of the elimination of the fouling induced surge problem of the system in the FIG. 1, the temperature of the gas from the compressor will be hotter and approach that of the gas from the turbine. Thus, the spray evaporator becomes increasingly important as a means for recovery of exhaust heat.

The power produced by a turbine is proportional to the temperature drop across the turbine, as well as the mass flow through it. Hence, the higher the temperature of the gas entering the turbine the greater the power produced. However, as previously discussed, the firing of the PFBC is limited to 1600. F to optimize sulfur capture and avoid carryover of harmful alkali vapors into the turbine. This limitation may be overcome by the use of a topping combustor burning a non-solid (gaseous or liquid) fuel. As in the previously discussed system the gas from the regenerator 31 is heated in an indirect heat exchanger 11, however, after the indirect heating the temperature of the hot compressed gas is further increased in a topping combustor, wherein the non-solid fuel is mixed and burned in the hot compressed gas. The gas supplies the oxygen necessary for combustion and absorbs heat released by the burning non-solid fuel. After discharging from the topping combustor, the gas partially expands in the high pressure section of the turbine and then enters the PFB as in the system previously discussed. Since raising the temperature of the gas entering the turbine raises the temperature of the gas exhausting from the turbine as well, the need to recover exhaust heat in the regenerator to optimize efficiency becomes increasingly important when a topping combustor is used.

Figure 3:
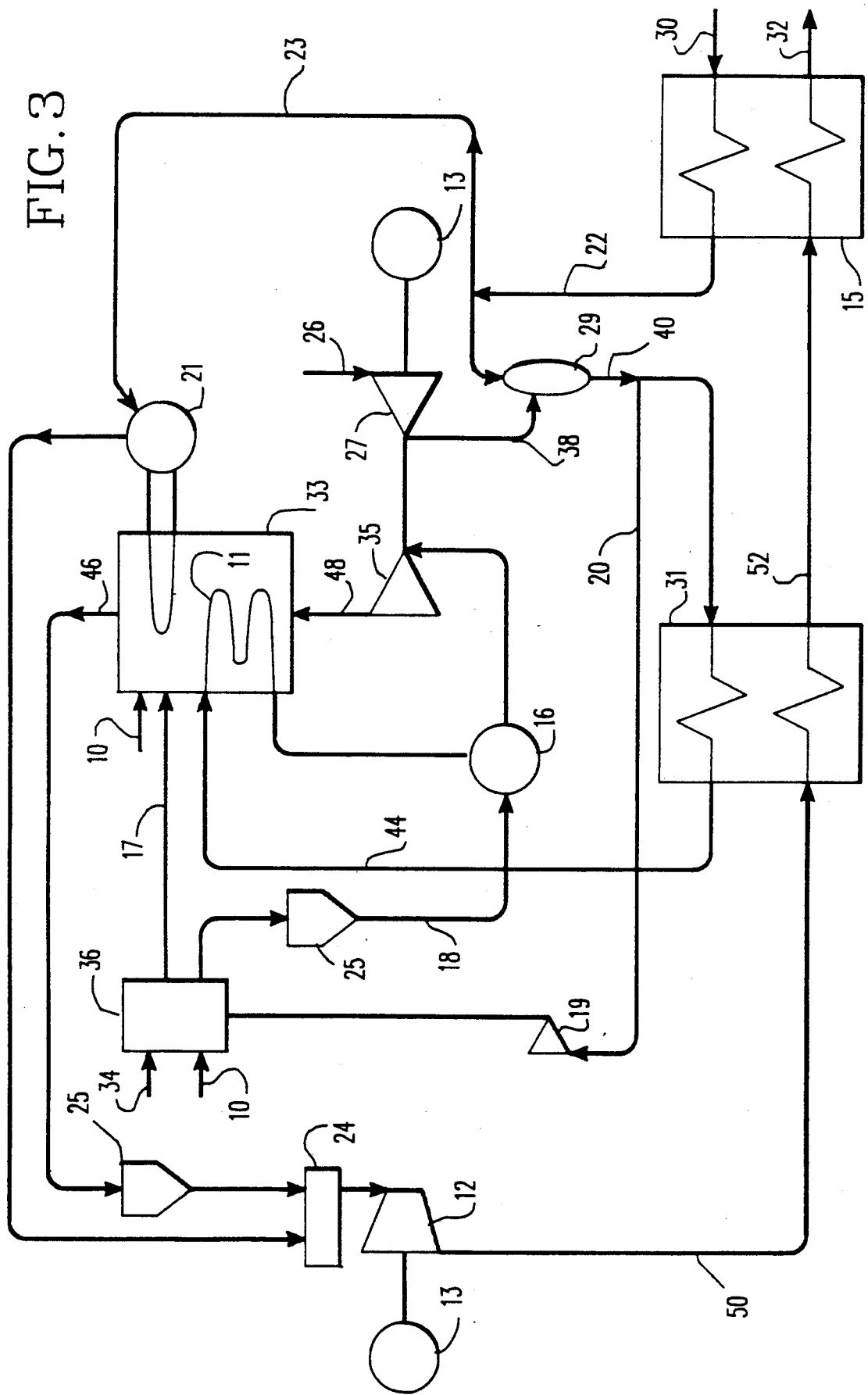
FIG. 3 is a schematic diagram of a solid fuel evaporative-regenerative gas turbine system with reheat, a topping combustor and a carbonizer.

FIG. 3 illustrates the use of a topping combustor 16, as well as other aspects of the integration of the evaporative-regenerative scheme into an advanced solid fuel gas turbine system utilizing coal. The coal is converted to a carbonaceous char and a hydrocarbon-based gas, typically low BTU gas, in a carbonizer 36 using a pyrolysis process. The carbonaceous char 17 is burned in the PFBC 33 and, after cleanup in a cyclone separator 25, the hydrocarbon-based gas 18 is burned in the topping combustor 16, allowing the maximum utilization of coal. In addition to coal 10 and sulfur sorbent 34, the carbonizer 36 requires a supply of high pressure oxygen. Such oxygen is obtained by a bleed 20 which directs a portion of the gas discharged from the spray evaporator 29 to a boost compressor 19 and thence to the carbonizer. Since it is more efficient to use the energy available in the coal in a topping combustor than in the PFBC, it is desirable to maximize the ratio of gas to char production in the carbonizer. Thus, in accordance with another aspect of the invention in a carbonizing-/topping combustor cycle, the moisture in the high pressure air supplied to the carbonizer as a result of the spray evaporator will increase the ratio of gas to char produced by the carbonizer, thus further improving the efficiency of such a system.

A steam generator 21 is required, in addition to the indirect heat exchanger 11, to control the temperature of the PFBC. The steam generator is supplied with feed water 23 and its heat transfer surfaces are disposed inside the PFBC, whereby they absorb heat to convert the feed water to steam. Under the prior art the steam generated in this manner was combined with that generated in the HRSG and utilized in a steam turbine. Since, according to the invention, the HRSG/steam turbine scheme is no longer required, FIG. 3 discloses the incorporation of a steam injection system 24 into the system. The steam injection system mixes the steam generated in the steam generator with the gas entering the low pressure section of the turbine thereby producing additional power in the turbine. Alternatively, the steam could be utilized in the high pressure section of the turbine by either injecting it into the gas to produce additional power, or distributing it, in a steam cooling system, to the portions of the high pressure turbine exposed to the gas to cool such portions of the turbine. While the use of the regenerator removes much of the excess sensible heat from the turbine exhaust gas, a portion still remains. Hence FIG. 3 discloses another aspect of the invention wherein water 30 and the cooled vitiated gas 52 from the regenerator flow through a gas/water heater 15, wherein the gas transfers a portion of its sensible heat to the water. The gas from the gas/water heater is then discharged to atmosphere through vent 32. A portion of the heated water 22 then supplies the spray evaporator 29 and the remainder 23 supplies feed water to the steam generator 21, thereby returning the heat to the system.

I claim as my invention:

1. A method for generating electrical power utilizing a compressor, spray evaporator, turbine, pressurized fluidized bed combustor (hereinafter PFBC), regenerator, dynamo-electric machine, and solid fuel, comprising the steps of:
   (a) compressing and heating air in said compressor;
   (b) cooling said hot compressed air in said spray evaporator, thereby producing cooled compressed air of increased mass flow;
   (c) heating said cooled compressed air in said regenerator, thereby producing heated compressed air;
   (d) fluidizing and burning said solid fuel in said PFBC using said heated compressed air to fluidize said solid fuel and provide oxygen for said burning, thereby producing hot compressed combustion gas;
   (e) expanding said hot compressed combustion gas in said turbine, thereby producing rotating shaft power and expanded combustion gas;
   (f) cooling said expanded combustion gas in said regenerator; and
   (g) converting said rotating shaft power to electrical power in a dynamo-electric machine.

2. A system for generating rotating shaft power which consumes coal and utilizes an oxygen bearing gas as its working fluid comprising:
   an axial flow compressor for compressing and heating said gas;
   a pressurized fluidized bed combustor (hereinafter PFBC) for heating said gas after compression in said compressor and in which a solid fuel is burned;
   a turbine for expanding said gas after heating in said PFBC, said turbine having a rotating shaft whereby expansion of said gas produces shaft power;
   means for evaporative cooling of said hot gas after compression in said compressor, whereby the temperature of said gas is lowered and its mass flow increased; and
   means for transferring sensible heat from said gas after expansion in said turbine to said gas after said evaporative cooling.

3. The system according to claim 2 wherein said means for evaporative cooling comprises a spray evaporator, said spray evaporator having:
   a supply of pressurized water; and
   a chamber through which said gas flows after compression in said compressor and into which water from said supply is sprayed.

4. The system according to claim 3 wherein said means for transferring sensible heat comprises a regenerator, said regenerator having:
   a chamber;
   first passageways through which said gas flows after expansion in said turbine;
   second passageways through which said gas flows after evaporative cooling in said spray evaporator; and
   barriers disposed in said chamber, said barriers forming said first and second passageways, said barriers allowing heat to flow between said first and second passageways, whereby said gas expanded in said turbine is cooled and said gas cooled in said spray evaporator is heated.

5. The system according to claim 4 wherein said solid fuel burned in said PFBC comprises said coal.

* * * * *